C. A. SMITH.
UNIVERSAL JOINT.
APPLICATION FILED FEB. 17, 1909.
972,270.  Patented Oct. 11, 1910.
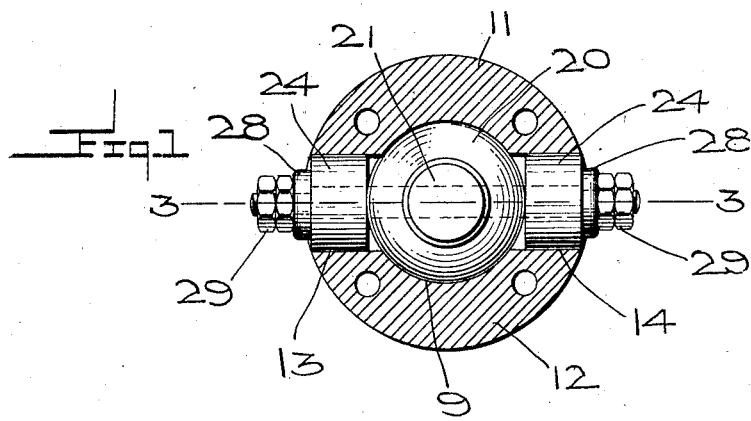
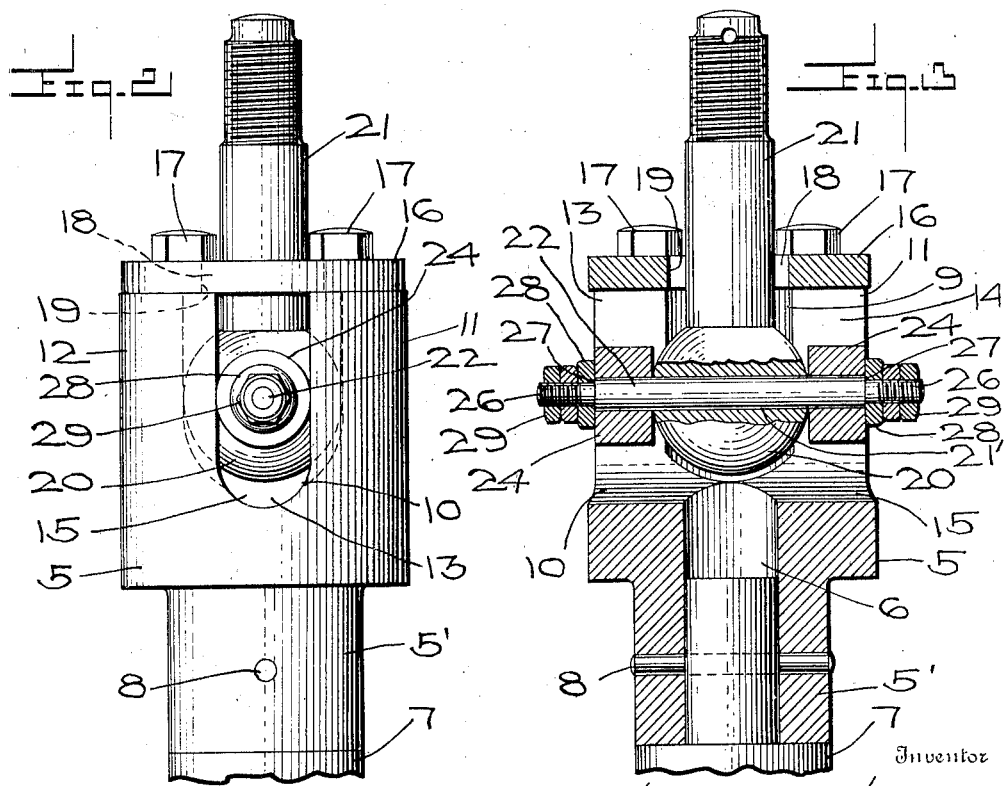

UNITED STATES PATENT OFFICE.

CLAUDE A. SMITH, OF DETROIT, MICHIGAN.

UNIVERSAL JOINT.

972,270.  Specification of Letters Patent.  Patented Oct. 11, 1910.

Application filed February 17, 1909. Serial No. 478,430.

*To all whom it may concern:*

Be it known that I, CLAUDE A. SMITH, a citizen of the United States, residing at Detroit, in the county of Wayne and State of Michigan, have invented certain new and useful Improvements in Universal Joints, of which the following is a specification.

This invention relates to connecting devices and more particularly to universal joints, and has for its object to provide a joint of this kind for use in shafting of various kinds, but particularly adapted for use in connection with the propeller shafts of automobiles, which will provide for a certain amount of slippage of the parts to compensate for the movement of the body of the automobile with respect to the chassis and which will include an arrangement reducing friction to a minimum.

Another object is to provide a structure in which the parts may be easily and quickly disconnected for repairs or replacement.

Other objects and advantages will be apparent from the following description and it will be understood that changes in the specific structure shown and described may be made within the scope of the claim without departing from the spirit of the invention.

In the drawings forming a portion of this specification, and in which like numerals of reference indicate similar parts in the several views, Figure 1 is a transverse section through the head portion, showing the arrangement of the rollers and the transverse pin, the latter being indicated in dotted line, Fig. 2 is a side elevation, Fig. 3 is a vertical section taken on the line 3—3 of Fig. 1.

Referring now to the drawings, the present joint comprises a head 5 having a stem 5' through which there is formed a passage 6 for the reception of a shaft member 7 secured in position by a transverse pin 8. The head 5 has a socket 9 formed therewithin, opening through the outer face of the head and communicating at its inner end with the passage 6. This socket 9 is somewhat larger than the passage 6 as indicated, and, as shown, the head is bifurcated as indicated at 10, to produce spaced portions 11 and 12, the bifurcation resulting in diametrically oppositely disposed passages 13 and 14 which have rounded inner ends 15 and which open through the outer end of the head. The outer ends of these passages are normally closed by means of an annular plate 16 which is held upon the outer end of the head by means of attaching screws 17. The central opening 18 of the annular plate is somewhat smaller than the socket 9, so that there is produced an inwardly extending portion 19 of the plate.

Disposed within the socket 9, there is a spherical head 20, which is carried by a stem member 21 extending out through the central opening 18 of the annular plate 16, and this spherical head 20 has a transversely extending circular passage 21' formed therethrough which receives a transverse pin 22. This pin extends outwardly through the passages 13 and 14 and has mounted thereupon at each end a roller 24, these rollers lying in the passages 13 and 14 respectively and engaging the sides thereof. The pin 22 is revoluble in the head 20, and, as will be understood, the rollers 24 revolve upon the outer portions of the pin. Beyond the outer faces of the rollers, the ends of the pin are reduced and threaded as shown at 26, there being thus formed a shoulder 27 adjacent to each end of the pin, these shoulders lying flush with the outer faces of the rollers 24. Washers 28 are engaged with the reduced portions of the ends of the pin, engaging the outer faces of the rollers, and beyond these washers there are lock nuts 29 upon each end of the pin. It will thus be seen that the lock nuts may be easily removed and the pin withdrawn from the rollers and head. In this way the rollers may be easily removed for replacement when worn or broken.

In operation, it will be observed that the stem 21 is free to move in a circle, its movement in one direction being permitted by the revoluble connection of the head with the rollers, and its movement in the other direction being permitted by the provision of the passages 13 and 14 which permit of rocking motion of the rollers therein. The length of the passages 13 and 14 is such that there is some independent motion of the two members in respect to each other to compensate for bodily movement of the applied ends of the two members, toward and away from each other.

What is claimed is:

In a universal joint, the combination with a member having a cylindrical socket therein provided with a rounded inner end, said member also having a pair of longitudinal oppositely disposed parallel slots therein communicating with the socket, said slots extending inwardly beyond the inner rounded end of the socket, of a stem having a spherical head snugly fitted within the socket, said head having a curvature corresponding to that of the rounded inner end of the socket and being arranged for engagement against the inner portions of the socket above the terminal ends of the slots; the rounded terminal end of the socket being arranged above said terminal end of the slots and out of contact with the spherical head of the stem, and rollers revolubly mounted upon the opposite sides of the head and lying one in each of the slots, said slots and rollers being of less width than the socket.

In testimony whereof I affix my signature, in presence of two witnesses.

CLAUDE A. SMITH.

Witnesses:
  W. N. YOUNG,
  MAZIE SMITH.